Sept. 29, 1959                  G. MYSKA                2,906,217
POSITION CONTROL FOR GROUP STITCH SEWING
AND THE LIKE MACHINES
Filed Aug. 21, 1956                          2 Sheets-Sheet 1

INVENTOR
GÜNTER MYSKA
BY
ATTORNEY

INVENTOR
GÜNTER MYSKA
BY
ATTORNEY

# United States Patent Office 2,906,217
Patented Sept. 29, 1959

2,906,217

POSITION CONTROL FOR GROUP STITCH SEWING AND THE LIKE MACHINES

Günter Myska, Kaiserslautern, Pfalz, Germany, assignor to G. M. Pfaff A.G., Kaiserslautern, Pfalz, Germany, a corporation of Germany Application August 21, 1956, Serial No. 605,382

13 Claims. (Cl. 112—67)

The present invention relates to novel means for position control, more particularly, though not limitatively, to apparatus for the automatic control of the stitch forming tools and/or the work feed relative thereto between individual operations of a multiple-operation sewing machine, such as a group stitch sewing machine or the like.

Devices for the control of the sewing operations and work feed advance by electrical or mechanical means have already become known in the art. These known devices have, however, been designed for the control of single and specific operations and for use in connection with specified limited operations and purposes, such as for the work feed control between two successive operations of a multiple-operation machine.

An important object of the present invention is, therefore, the provision of improved position control means, especially for the automatic control of group stitch sewing machines, which has an increased usefulness and flexibility in adapting it for the automatic control of the stitch forming or other tools in relation to the work feed advance or position.

A more specific object of the invention is the provision of control apparatus of this type which is effective between successive stitching or other operating cycles, to suit existing conditions and operating requirements.

Still another object of the invention is to provide control apparatus of this character which may be preadjusted or set to operate fully automatically both with regard to the extent of the successive work feed movements or positions of a work piece, as well as with regard to the number of operations to be performed at the preselected distances from one another.

Yet another object of the invention is the provision of a control device of this character capable of automatically stopping the machine and placing it in condition for renewed operation, upon completion of a fully preselected programme of operations and/or work feed cycles, respectively.

Figure 1:
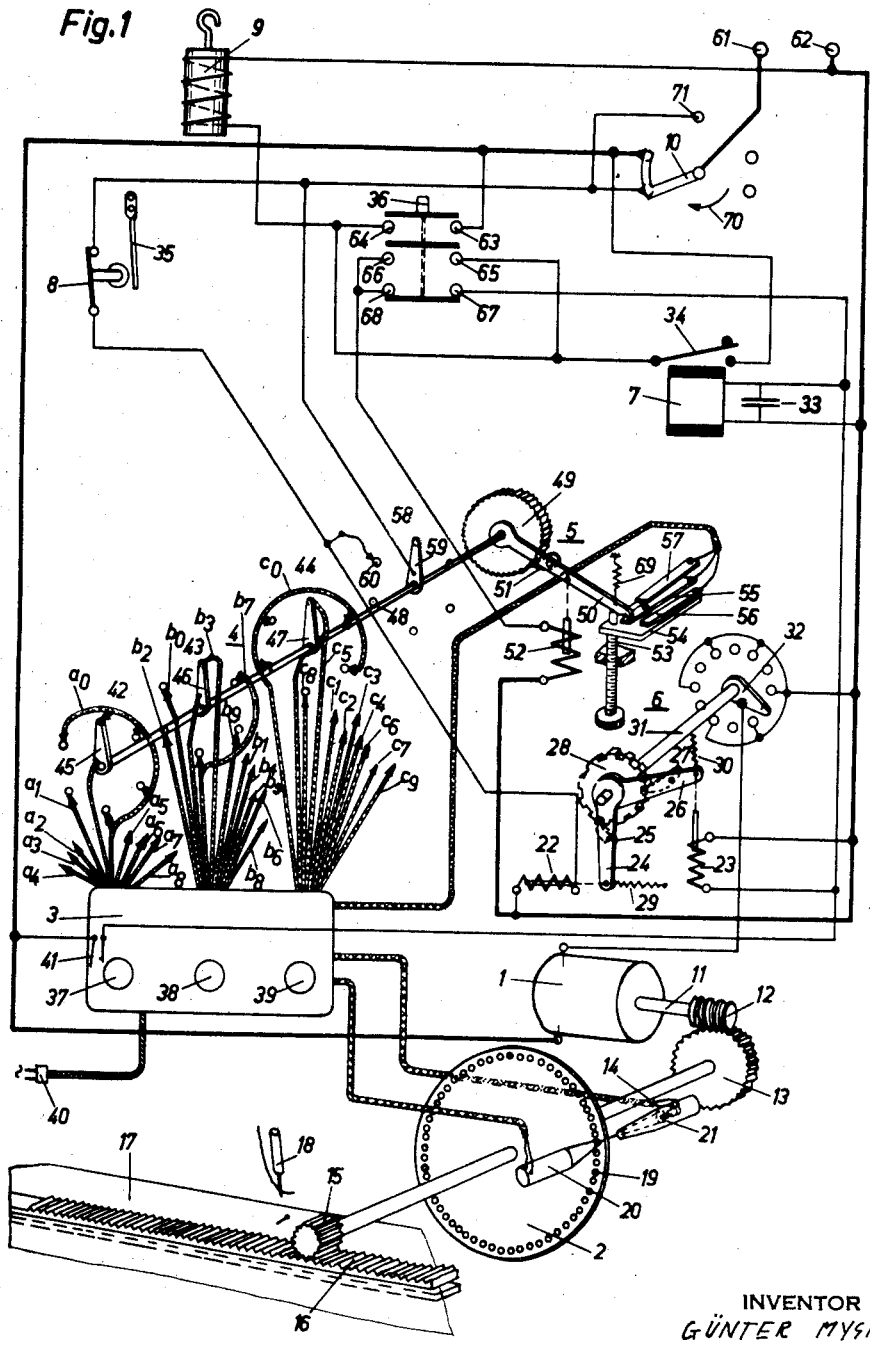
Figure 2:
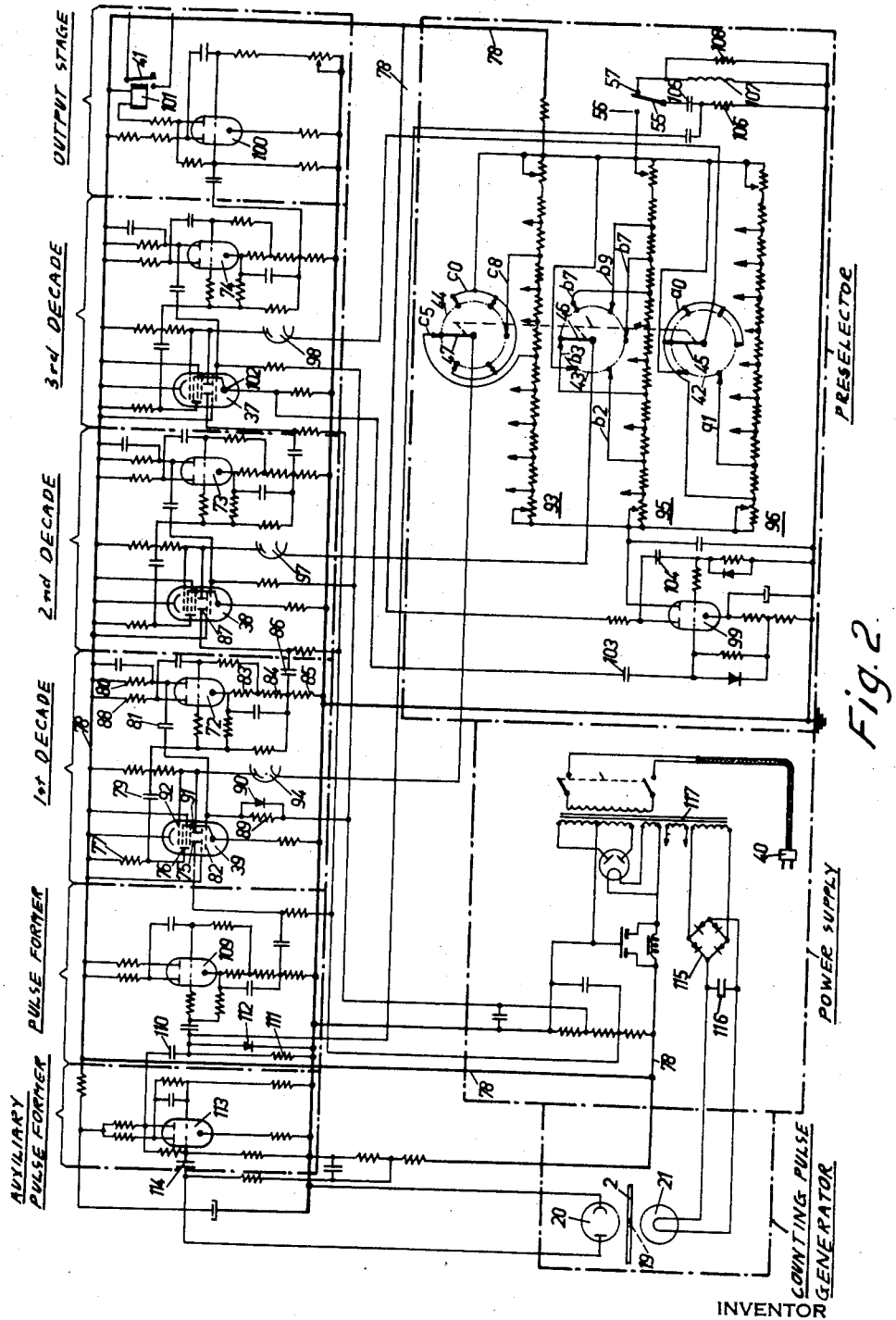

The invention, as to its further objects and novel aspects, will be better understand from the following detailed description of a practical embodiment thereof in conjunction with a button-hole sewing machine as shown by the accompanying drawings forming part of this specification and wherein: Fig. 1 is a complete schematic diagram of the essential elements and the electric control system of an automatic position control apparatus constructed in accordance with the principles of the invention; and Fig. 2 is a more detailed circuit diagram of the electronic counting device and its operative connection with the system of Fig. 1. Like reference characters identify like parts in both views of the drawings.

While, in the following, the invention will be described with specific reference to a button-hole sewing machine of known construction, to automatically control the feed or advance movement of the work piece for the sewing of a number of button-holes at predetermined distances, whereby furthermore both the number of button-holes and spacing distances therebetween may be preselected in accordance with a desired operating programme, the improved control apparatus according to the invention may be used with equal advantage in connection with other operations, wherein the movement or advance of any member is to be controlled automatically in dependence of other moving members or operations of the machine.

With specific reference to group stitching sewing machines, such as button-hole sewing machines, referred to by way of example in the following, the latter ordinarily include means, such as a starting solenoid or magnet, which upon energization serves to start the operation of the stitch forming tools of the machine, and further means to automatically stop the machine upon carrying out a predetermined number of stitches during a single button-hole sewing operation.

Group stitch sewing machines of this type are well known to those skilled in the art and further details thereof, except for the starting solenoid and an auxiliary switch responsive to the operative and non-operative condition of the machine or stitch forming tools, are omitted from the drawing as being unnecessary for the understanding of the invention and in order to simplify the disclosure and description.

Furthermore, while a single control device is shown to control the work feed movement, additional similar devices may be provided for the control of other moving members, independently of or in cooperation with the work feed movement.

With the foregoing objects in view, the invention is based generally on the thought of subdividing the movement of the work supporting means or equivalent movable member into a large number of incremental fractional units or elemental movements, the latter being counted by suitable counting means as the movement of the work support or other movable member progresses during a full advance or feed movement from one to the next operating point. In the example shown in the drawing, the invention causes the work support such as a carriage, clamping frame, etc. to be advanced relative to the stitch forming tools from one to the next position of a button-hole to be sewn upon the work. The work is advanced by suitable drive means, such as electric motor, controlled by relays until reaching of a predetermined number or combination of digits by the counting device, corresponding to the desired number of incremental and preselected feed movements, whereupon the motor is stopped and the sewing operation initiated automatically.

For this purpose a suitable counting pulse generator in the form of a current interrupter or chopping device, being either optical, mechanical, capacitative, inductive, etc., may be mounted upon the shaft of the drive motor for the work supporting means, to produce a sequence of electric counting current pulses as the work advances through a desired number of preselected incremental distances, said pulses being applied to the counting device preferably in the form of an electronic decade counter. The counter, in turn, cooperates with a suitable programming device for the preselection of both the individual feed movements from one to the next operating point upon the work, as well as of the number of operations, such as the number of button-holes to be sewn during a full operation or programme.

The counter may comprise one or more conventional electronic decade counting tubes which require only a slight modification for connection with and cooperation with the programme switch according to the invention, to produce a desired number of successive work feed movements and sewing operations. The programme switch which may take the form of a contact drum controlled by an electric or mechanical switching device is provided with a different bank of peripheral contacts each cooperating with one of the counting tubes. The contacts for the switch are connected to the tap points of the potential dividers normally associated with the counting tubes, to set or adjust the latter for a desired preselected number or operating programme, in the manner described in greater detail hereafter.

The programme drum may be exchangeable with other drums designed for a different operating programme and the number of contacts of the drums may be variable to suit existing conditions and requirements.

The counting pulse generator controlled by the feed motor may be in the form of a light chopper, a mechanical interrupter operated by a cam or contact disc, or in the form of a capacitative or inductive pulse generating device of the type well known in the art.

The final pulse produced by the counter upon termination of a counting operation serves to control the sewing operation through a first relay, a further relay being provided to control the work feed movement between successive sewing operations. The starting of a new operating programme is effected by a manual start switch which additionally serves to move the programme switch from its zero position to the first preselected position of the counter and to subsequently disconnect the relay switch during the starting of the machine.

In order to indicate the proper operating position of the counter, a further multiple switch may be provided connected to and automatically controlled by the programme switch, in the manner described in greater detail hereafter.

Referring more particularly to Fig. 1 of the drawing, the control system shown comprises essentially a drive or work feed motor 1 effecting the advance of the work between one and the next sewing operation, a counting pulse generator 2 shown in the form of a perforated disc or light chopper, to produce counting pulses at a repetition frequency proportional to the work feed advance and applied to an electronic counter 3, a programme switch or drum 4 controlled by an electromagnetic step switch 5, a step switch relay 6 controlling the feed motor 1, an automatic starting relay 7, a manual starting switch 36, an auxiliary switch or contact 8 controlled by the work clamp or presser foot lever 35 of the machine, a starting magnet or solenoid 9 for starting the sewing machine, and finally a main control or power switch 10.

The feed motor 1 has a shaft 11 carrying a worm 12 which meshes with a gear 13. The latter, in the example shown, has a shaft 14 to the opposite end of which is connected a pinion 15 engaging a rack 16 forming part of the work clamping device or carriage supporting the work. The latter is shown at 17, while the cooperating stitch-forming tool is indicated at 18. Further mounted upon the shaft 14 is a perforated disc 2 of the light chopper which is provided with a plurality of peripheral perforations or slots 19 spaced at equal distances from one another. The disc 2 operates in a known manner to periodically interrupt the beam of a light source 21 impinged upon a photoelectric cell 20, whereby to produce a series of counting current or voltage pulses in proportion to the work feed advance, said pulses being applied to the input of the electronic counter 3. As a result, each pulse corresponds to a definite incremental feed or advance movement of the work, say 1 mm. between one and the next counting pulse, by the proper design of the disc 2 and spacing distances between the perforations 19, respectively.

The switch relay 6 controlling the work feed motor 1 comprises a pair of magnet coils 22 and 23 which, when energized, cause a ratchet 28 to be advanced by a first lever or armature 24 provided with a spring-urged pawl 25 or a second lever 26 having a spring-urged pawl 27, respectively. The levers 24 and 26 are subject to the action of control or return springs 29 and 30, respectively. The advance of the ratchet 28, in turn, causes a shaft 31 carrying a contact arm 32 to move the latter alternately from one of its On positions to the next Off position, and vice versa. In the position shown in the drawing, the arm 32 is in the Off position of the relay 6. The automatic starting switch is in the form of a delayed-action relay 7 which, for this purpose, may be shunted by an electrical capacitor 33 having a relatively high capacitance. The contact 34 of the relay 7 controls the starting magnet or solenoid 9 of the sewing machine which serves to start the operation of the machine or of the stitch-forming mechanism. As pointed out, the switch on contact 8 is operated by the work clamp lever 35 associated with conventional sewing machines, in such a manner that the switch 8 is open during the operation of the machine or button-hole sewing cycle, while the switch is closed in the rest or inoperative position of the machine or stitch forming tool. The manual starting switch 36 serves to initiate the first operation of a desired operating programme, the subsequent operations being automatically initiated by the relay 7 in accordance with the preselected programme or sequence of operations determined by the design and connection of the programme switch 4 with the counter 3, in the manner described in greater detail hereafter.

The electronic counter, in the example shown, comprises three decade counting tubes 37, 38 and 39 and is energized from a suitable power source, such as a house lighting circuit, through a plug connector 40.

Electronic counting tubes as known in the art indicate a full decade of digits from 0 to 9 and, for this purpose, include means to produce a band-shaped electron beam controlled to assume 10 stable positions indicated by a linear image in cooperation with a corresponding digit scale upon the fluorescent screen of the tube. A voltage impulse applied to the input of the tube causes the electron beam to move from one to the next digit until, upon reaching the digit 9, the beam is suddenly returned to 0 and, in turn releases a pulse applied to the next counting unit or tube of the counter. Thus, in the case of a counter having three counting tubes, as shown in the drawings, all the tubes are returned to 0 by the final pulse upon reaching number 999. This final pulse produced by the last tube may be utilized for the control of further operations and, in the case of invention, serves to close a contact or switch 41 of a relay embodied in the counter. If the final pulse is to occur after a different number of counting pulses applied to the input of the counter, it is necessary to apply a complementary number of pulses to the counter prior to the starting of the counting operation. Thus, for instance, if the final pulse or closing of the relay 41 is desired after the 35th counting pulse, corresponding to a desired advance of the work 17, the three tubes must be set prior to the counting operation to a number 1000−35=965. Each position of the electron beam of a decade counter 2 is determined by a definite potential or voltage between a deflecting plate and the anode of the tube. For this purpose, the conventional counters are provided with potential dividers having a number of tap points for setting the counter to a desired number or starting position.

In accordance with the present invention, the taps of the potential divider are connected through suitable leads with a programme switch designed and/or adjusted to count a desired number or successive numbers, to correspondingly control the work feed advance by the drive motor 1. In the drawing, the leads from the counter tube 37 are designated by the letter $a$, the leads from tube 38 are designated by the letter $b$, while the leads from the tube 39 are indicated by the letter $c$. The indices 1 to 10 as applied to said leads represent the complementary digits, that is, the digits corresponding to the preselected number, that is, number 965 in the example mentioned.

The adjustment of the counter according to the invention is effected by means of a programme switch or drum 4 which, in the example illustrated comprises three sets of contacts, 42, 43 and 44 cooperating with contact arms 45, 46 and 47, respectively. The contact arms are mounted upon a common shaft 48 and may be advanced in clockwise direction by the step switch 5. In the example shown, the programme switch 4 is so designed and connected with the counter 3, to cause successive feed advance movements of the work 17 of 35, 70, 90, 78 and 120 mm., respectively, assuming 1 mm. to correspond to the rotation of the disc 2 by an angle from one to the next perforation 19. In other words, only those leads from the potential dividers of the counter 3 are connected to the respective contacts of the programme switch 4, as will result in the desired counting operations and corresponding successive advance feed movements of the work.

In the foregoing example, these are the leads $c_0$, $c_5$ and $c_8$ for the first decade (39), the leads $b_0$, $b_2$, $b_3$, $b_7$ and $b_9$ for the second decade (38), and the leads $a_0$, $a_1$ for the third decade (37). As is understood, the programme drum 4 may be provided with any desired number of contacts whereby any number of feed advance movements may be selected and controlled.

Mounted at the opposite end of the shaft 48 of the programme switch 4 is a ratchet 49 which may be advanced progressively by a lever 50 provided with a spring-urged pawl 51 and controlled by a magnet coil 52 of the switch 5. There is further provided an adjustable stop 53 to adjust the stroke of the lever 50 in order to adapt the switch for use with different types of programme drums or number of operating contacts. The lever 50 operates a three-pole switch 54 in such a manner that a closing of the spring contacts 55 and 56 of the switch 54 by the lever 50 causes all the counting tubes to be adjusted to the digit 9, whereby to indicate to the operator that the device is in proper operating condition. Upon closing of the contact springs 55 and 57 of the switch 54, the counting tubes are adjusted to the number preselected by the design and connection of the programme switch 4, that is number 965 according to the example mentioned.

There is shown a further bank of contacts 58 of the programme switch 4 which serves to short-circuit the switch 8 at a predetermined position of the switch 4, for a given selected operating program as will be the case when a further contact arm 59 upon shaft 48 engages the auxiliary contact 60, as shown in the drawing. The purpose of this short-circuit arrangement will further appear from the following.

In the following the function and operation of the control device is described in detail. The switch 10 is assumed to be in the On position, the sewing machine is at rest and the contact 8 in closed position as shown in the drawing. As a result, operating voltage is applied via the terminal posts 61, 62, connected to a suitable power supply source, the switch 10 and the contact 8, to the magnet coil 22 of the switch relay 26. As a result, the contact arm 32 is moved to one of its Off positions, as shown in the drawings.

The electronic counter is connected to its power supply source through the plug 40 while the contact arms 45, 46, 47 and 59 of the programme switch 4 are in the starting or "0" position, that is a position displaced by one contact in counterclockwise direction from the position shown in the drawing. The lever 50 is in its uppermost position, while the contacts of the programme switch 4 are connected with the corresponding leads $a$, $b$ and $c$ of the counter to result in the sewing of a successive number of button-holes at relative distances of 35, 70, 90, 78 and 120 mm., in accordance with the example assumed and shown for illustration.

After insertion of the work 17 in the feed carriage or the like, the manual starting switch 36 is depressed briefly and released. As a result, the starting magnet 9 is energized via the contacts 63 and 64 of the switch 36 which, in turn, causes the operation of the starting lever of the machine and starting of the stitch-forming tools, to initiate a button-hole sewing operation.

Furthermore, upon depressing the switch 36, contacts 65 and 66 are closed and contacts 67 and 68 opened. As a result, the magnet coil 52 is energized causing the lever 50 to be pulled in a downward direction, and, in turn, moving the programme drum from its "0" position into the position shown in the drawing, for the sewing of the first button-hole while the switch arms 45, 46 and 47 are connected with the leads $a_0$, $b_3$ and $c_5$ of the counter. At the same time, the contacts 55 and 56 are closed, causing each of the counting tubes 37, 38 and 39 to indicate digit 9 and apprising the operator of the proper operating condition of the device. After release of the starting button or switch 36 and opening the contact of 65 and 66, the magnet coil 52 is deenergized and the lever 50 pulled upwardly by the action of the spring 69, whereby the pawl 51 slides over the ratchet 49 without operating the programme switch 4. The contact springs 55 and 57 are now closed, whereby to set the counting tubes 37, 38 and 39 to the preselected starting number, that is number 965, in the example mentioned.

Upon starting of the sewing machine, the work clamp lever 35 is lowered upon the work resulting in the opening of the switch or contact 8. As a result, the magnet coil 22 of the switch relay 6 becomes deenergized and the pawl 25 slides over the ratchet 28 without operating the switch arm 32 which remains in the Off position.

After termination of the first button-hole sewing operation, the contact 8 is reclosed by the lever 35 and the magnet coil 22 again energized, whereby to cause the switch arm 32 to advance to the next On position. As a result, the feed motor 1 is connected to the power source, thus starting the advance movement of the work 17 and causing the counting pulse generator to produce a number of consecutive voltage pulses determined by the number of perforations 19 of the disc 2, said pulses being applied to and counted by the counter 3, in the manner described and understood from the foregoing.

Each counting pulse corresponds to a predetermined incremental movement of the work 17 determined by the number of perforations 19 or current interrupting elements of an equivalent mechanical, electrostatic, or the like pulse generator.

Since, in the example mentioned, the counting tubes 37, 38 and 39 have been set to the starting number 965, the tubes upon counting 35 pulses and transition from the last digit 9 to 0 cause a closing of the switch or contact 41 which, in turn, results in the energization of the magnet coil 23 of the switch relay 6, thereby advancing the switch arm 32 to the next Off position and resulting in an instantaneous disconnection of the feed motor 1 which is preferably equipped with a quick-acting breaking device. At the same time, the starting relay 7 is energized causing a charging of the capacitor 33 which subsequently discharges through the winding of the relay 7. As a result, relay contact 34 is closed after a lapse of a certain time period. This results in a renewed energization of the magnet coil 52 through the closed contacts 67 and 68 of the switch 36, whereby the contact arms 45, 46, 47 and 59 of the programme switch 4 are advanced in clockwise direction by one step so as to connect the switch 4 to the leads $a_0$, $b_3$, and $c_0$ of the counter 3. As a result, the counting tubes 37, 38 and 39 indicate the complementary number 930 for the next work feed movement and sewing cycle, according to the example mentioned.

The contact 34 of the automatic starting relay 7 is connected in parallel to the contacts 63 and 64 of the manual starting switch 36, thus energizing the starting solenoid 9 and automatically initiating the operation of the machine for the sewing of the second button-hole. This operation is continued during or the succeeding sewing operations, that is, the switch 36 is used only for manually starting the first operation, while the subsequent preselected operations are initiated automatically by the relay 7, in the manner described.

In order to prevent continued running of the feed motor 1 upon termination of the last sewing operation and despite the setting of the counting tubes 37, 38 and 39 to 0, it is necessary to bridge contact 8 through the contact arm 59 and contact 60 of the programme switch 4. As a result, the magnet coil 22 remains energized after opening of the contact 8, the contact arm 32 is in one of its Off positions and the feed motor 1 is disconnected from the power source.

The main switch 10 is designed to be operable in clockwise direction only as indicated by the arrow 70. Upon operation of the switch from the On position shown in the drawing to its Off position, the magnet coil 22 of the switch relay 6 is disconnected from the power source, whereby switch arm 32 remains in its Off position. Shortly before the main switch reaches its Off position, a further current pulse is applied via the auxiliary contact 71 to the magnet coil 22, thereby advancing the switch arm 32 to the next On position. In this case, the feed motor 1 is prevented from operation, having previously been disconnected from the power source or terminal posts 61, 62. Upon renewed operation of the switch 10 to its On position as shown in the drawing, the magnet coil 22 again receives a current pulse, thus causing the switch arm 32 to move to the next Off position, as shown in the drawing. These switching operations are necessary, since the magnet coil 22 is continuously energized in the zero or rest position of the sewing machine.

Fig. 2 shows a more detailed circuit diagram of the electronic counter 3 and its connection with the programme switch 4, to cause a desired sequence of operations and work feed movements, in the manner described hereinabove. As pointed out, the decade counter tubes 37, 38 and 39 are in the form of small cathode ray tubes including beam forming means to produce a band-shaped electron beam controlled to assume ten successive positions by the application of a predetermined number of counting pulses or operating voltages to the electrostatic deflecting means of the tubes. This causes a luminous line to appear upon the screen of the tubes corresponding to the respective digits or numbers 0 to 9.

More specifically, each counting pulse applied, for instance, to the input tube 39, causes the electron beam to be advanced by one digit until finally with the 10th counting pulse, the beam is suddenly reset or returned from digit 9 to 0 position. At the same time, a voltage pulse is produced which may serve for the initiation of any control operation or for the advance of the beam of the next decade tube or counter stage 38.

The position of the electron beam may be adjusted to any digit position by the application of a suitable deflecting potential to the deflecting electrodes of the tube, whereupon the electron beam will remain in this position until a new pulse or potential is applied.

The flyback or resetting of the beam and the application of the counting pulses to the tube, is effected by the aid of flip-flop connected double-triodes 72, 73 and 74, each being associated with one of the counting tubes 39, 38 and 37, respectively. These tubes operate as pulse translating devices and are designed in accordance with the well known mono-stable Eccles-Jordan flip-flop circuit. In other words, they exhibit both a stable and an unstable condition. As an example, if a negative pulse is applied to the grid of the left hand section of the tube 72, the current through this section is blocked and a current will pass through the other section of the tube. This condition remains in force only a short time and the tube flips back to its previous position, that is, where the left hand section conducts and the right hand section is blocked.

With the 10th counting pulse being applied to the deflecting plate 75 of the first counting tube stage 39, the electron beam is shifted to the extreme left to impinge upon the reset or flyback anode 76 which is connected through a resistor 77 with the anode supply line 78 carrying a relatively high operating potential. This results in a voltage drop across the resistor 77 which is connected through a capacitor 79 to the left hand grid of the double-triode 72. The latter is thereby triggered to cause its right hand section to conduct, in the manner described above. This, in turn, causes a negative voltage pulse across a resistor 80, said pulse being applied by way of a capacitor 81 to the grid 82 of the counting tube 39, whereby to interrupt the electron beam of this tube. This, in turn, removes the voltage drop at the resistor 77. Interruption of the beam current has the further effect that the anode voltage which assumed its lowest value upon reaching the digit 9, is again increased. Upon removal of the blocking of the control grid, the anode current is restored, adjusting itself automatically to the next stable position, that is, corresponding to the digit 0.

The triggering of the double-triode 72 furthermore serves to apply a positive pulse to the next counter tube or stage 38. For this purpose, a portion of the voltage at the cathode resistance 83, 84 and 85 of the flip-flop stage is applied through a capacitor 86 to the deflecting plate 87 of the counter tube 38 of the second decade stage, the resulting impulse being positive, since the resistor 80 of the right hand section of the triode 72 is smaller by one order of magnitude than the resistor 88 of the left hand section of the tube.

The connection of the remaining decade stages is the same, with the exception of the first stage which includes a germanium diode limiter 90 connected in parallel to the grid leak resistor 98 of the grid 82, to prevent the potential of the grid 82 to increase in case of high counting speeds. The subsequent stages do not require a limiter, since the counting speed is reduced by one order of magnitude.

The position of the beam of the counter tube 39 is determined by a definite potential between the deflecting plate 91 and anode 92. The potential difference from digit to digit is about 14 volts. Accordingly, if a variable direct current voltage is applied to the deflecting plate 91 and anode 92 through a voltage divider 93, and the switch 47 of the programming device 4, a desired number or digit between 0 and 9 may be set by varying the tap point upon the voltage divider. Further connected between the switch 47 and the deflecting plate 91 is a diode 94 whose cathode is connected to the switch 47. Each decade stage has associated with it a similar voltage divider 93, 95 and 96 whose switches 47, 46 and 45 are connected through diodes 94, 97 and 98 with the right hand deflecting plates of the counting tubes 39, 38 and 37, respectively.

The preselector further includes an electronic switch in the form of a double-triode 99 which serves to disconnect the left hand sides of the voltage dividers 93, 95 and 96 from the negative pole of the supply voltage, after the preselection and prior to the starting of the counting operation. The cathodes of the diodes 94, 97 and 98 are thus biased to a positive potential and blocked. The beams of the counting tubes 39, 38 and 37, remain, however, upon the preselected digits. According to the example mentioned, the counting tube 39 and the first decade is set to the digit 5, whereby, after five counting pulses, the beam is returned to 0 and continues to count in a normal manner. The counting tubes 38 and 37 being adjusted to digits 3 and 0, respectively, function in similar manner until upon receiving the 34th pulse, the counter arrives at the number 999. The next following pulse controls the final stage which again consists of a flip-flop connected double-triode 100 controlling a relay 101. The latter has a contact 41, Fig. 1, which serves to initiate the control of the work feed and sewing operation, in the manner described hereinbefore.

The negative pulse produced during the reset operation at the cathode 102 of the last counting tube 37 is applied to the grid of the left hand section of the double-triode switch 99 by way of a capacitor 203. The resulting positive anode pulse is, in turn, applied through a capacitor 104 to the grid of the right hand triode of the tube 99, whereby the latter conducts during a short period. As a result, all the counting tubes 39, 38 and 37 are adjusted to the preselected number prior to the starting of a new sewing cycle.

The diagram of Fig. 2 furthermore shows the control means to indicate the operating condition of the device by the three-pole switch 55, 56, 57. Upon closing of the contact 55, the potential of the switches 47, 46 and 45, prior to the charging of the capacitor 105, is reduced to such a value that all counting tubes 39, 38 and 37 are set to 0. If this is not the case, the circuit is not in proper operating condition due to faulty contacts and other defects.

Upon release of the contact 55, capacitor 105 is discharged through a resistor 106 and a parallel circuit comprising a self induction coil 107 and a further resistor 108, whereby to produce a negative pulse applied to the input of the counter and causing the tubes 39, 38 and 37 to be set to the preselected starting number or digits.

Preceding the counter is a pulse former which serves to shape the input counting pulses both as to amplitude and flank steepness. This input stage which consists of a flip-flop connected double triode 109 is designed differently from the pulse translating stages between the counting stages.

The counting pulses generated by the light chopper comprising the perforated disc 2, the photoelectric cell 20 and light source 21 are applied to the left hand section of an auxiliary double triode pulse former stage 113 by way of a coupling capacitor 114. The coupling circuit between the stage 113 and 109 includes a differentiating network comprising a capacitor 110 and a resistor 111 shunted by a diode limiter 112 to produce sharply peaked input pulses applied to the counter. The light source 21 is advantageously energized by the rectifier power supply of the system 115, 116, 117 of conventional construction.

In the foregoing, the invention has been described with reference to a specific illustrated device. It will be evident, however, that variations and modifications, as well as the substitution of equivalent elements and devices for those shown for illustration, may be made without departing from the broader scope and spirit of the invention as set forth in the appended claims. The specification and drawings are accordingly to be considered in an illustrative rather than a restrictive sense.

I claim:

1. Position control apparatus comprising a movable member and electric drive means therefor to advance said member from one to a following operating position, means to control the advance of said member comprising means moving in proportion to the movement of said member to produce a series of consecutive electric counting pulses, each counting pulse corresponding to a predetermined incremental movement of said member, an electronic counter comprising a number of decade counting tubes to count said pulses, each of said tubes adapted to count a full decade of digits and each tube excepting the last tube controlling the next tube to afford counting of a limit number determined by the number of decade stages and the last tube adapted to produce a control pulse upon reaching of said limit number, means to stop said drive means by said control pulse, and adjustable potentiometer means for each said counting tubes to set said counter to a preselectable number below said limit number, whereby to cause said drive means to advance said member by a distance corresponding to the number complementary to the preselected number.

2. Position control apparatus comprising a movable member and electric drive means therefor to advance said member from one to a following operating position, means to control the advance of said member comprising an electric pulse generator adapted to produce a series of consecutive counting pulses, each counting pulse representing a predetermined incremental movement of said member, an electronic pulse counter comprising a plurality of decade counting tubes to count said pulses, said counter including means to produce a final control pulse upon reaching of the limit counting number determined by the number of decade counting stages, adjustable potentiometer means for each counting tube for presetting said counter to a desired starting number below said limit number, and means controlled by said control pulse to stop said drive means, whereby to advance said member by a distance corresponding to the number complementary to said starting number.

3. A control system for multiple-operation sewing and the like machines having a support for carrying a work piece to be advanced from one to the next of a plurality of spaced operating positions and means to automatically stop said machine upon completion of an operating cycle, said control system comprising electric drive means for said support, an electric counting pulse generator adapted to produce a series of consecutive counting pulses, each counting pulse representing a predetermined incremental advance movement of said support, an electronic counter comprising a plurality of decade counting tubes to count said pulses, said counter including means to produce a control pulse upon reaching its limit counting number determined by the number of decade counting stages, adjustable potentiometer means for presetting said counter to a desired starting number lower than said limit number, means responsive to said control pulse to stop said drive means, whereby to advance said support by a distance corresponding to the number complementary to the preset number of said counter, and delayed-action control means responsive to said control pulse, to automatically start said machine and to initiate an operating cycle upon completion of an advance feed movement of said support.

4. A system as claimed in claim 3, wherein the next-to-the-last-named means is comprised of an electronic step switch alternately operable from On to Off position, and means to control said switch by said control pulse and by a further pulse produced upon stopping of the machine after completion of an operating cycle.

5. A system as claimed in claim 4, including a programming switch comprising a plurality of contact banks each coordinated to one of said counting tubes and co-operating contact arms therefor adjustable by a common operating member, each said contact banks having a predetermined number of contacts connected to points of said potentiometer means, to effect a successive advance of the work between individual operations of said machine through different distances according to the adjusting position of said switch.

6. A system as claimed in claim 4, including a programming switch comprising a plurality of contact banks each coordinated to one of said counting tubes and co-operating contact arms therefor adjustable by a common operating member, each said contact banks having a predetermined number of contacts connected to points of said potentiometer means, and further means controlled by said delayed-action control means, to advance said programming switch from one to the next position, whereby to cause a series of consecutive automatic operations of said machine at operating positions spaced by predetermined distances upon said workpiece.

7. A control system for multiple-operation sewing and the like machines having a support for carrying a work piece to be advanced from one to the next of a plurality of operation positions, electric starting means for said machine and means to automatically stop said machine upon completion of an operating cycle, said system comprising electric drive means for said support, an electric counting pulse generator operating in proportion to the movement of said support and adapted to produce a series of consecutive counting pulses, each pulse representing a predetermined incremental movement of said support, an electronic pulse counter comprising a plurality of decade counting tubes to count said pulses, said counter including means to produce a control pulse upon reaching the final counting number determined by the number of decade counting stages, potentiometer means having a plurality of tap connections for presetting said counter to a desired starting number lower than said final counting number, relay means controlled by said control pulse to stop said drive means, whereby to advance said support by a distance corresponding to the number complementary to the preset number of said counter, further delayed-action relay means controlled by said control pulse to operate said starting means for initiating an operating cycle of said machine, and a programming switch having a plurality of contact banks each coordinated to one of said counter tubes and cooperating control arms therefor adjustable by a common operating member, each contact bank having a number of contacts connected to predetermined tap connections of the potentiometer means of the associated counter tube, whereby adjustment of said programming switch causes different consecutive advance movements of said support between individual operating cycles of said machines in accordance with the preset numbers of said counting tubes, respectively.

8. A system as claimed in claim 7, including a further means controlled by said control pulse to operate said programming switch from one to the next position, to effect a number of consecutive operating cycles and intervening advance movements of said work piece at predetermined spacing distances corresponding to the preset numbers of said counter, respectively.

9. A system as claimed in claim 8, including a manual starting switch for operating said starting means to initiate the first cycle of a complete program, and means controlled by said delayed-action relay to disable said starting switch during the automatically controlled operating cycles within said program.

10. In apparatus as claimed in claim 1, wherein said counting pulse producing means is comprised of a perforated disc operated by said drive means and arranged to interrupt a light beam exciting a photoelectric cell, to produce electric counting pulses applied to the input of said counter.

11. A control system including a movable member and electric drive means for said member, said system comprising means moving in proportion to said member and adapted to produce a series of consecutive electrical counting pulses, each counting pulse corresponding to a predetermined incremental movement of said member, an electronic pulse counter comprising a number of decade counting tubes, each said counting tubes adapted to count a full decade of digits and each tube, excepting the last tube, controlling the next tube, to effect counting of a limit number determined by the number of decade stages, said last tube adapted to produce a control pulse upon reaching of said limit number, means to apply said pulses to said counter, means to stop said drive means by said control pulse, and further means including adjustable potentiometer means for each said counting tubes, to pre-set said counter to a predetermined number below said limit number, whereby to effect an automatic stoppage of said member after a predetermined movement corresponding to the number complementary to said preset number in respect to said limit number.

12. In a control system for group-stitch sewing and the like machines having feed means for supporting a work piece to be advanced from one to the next of a plurality of spaced operating positions and means to automatically stop said machine upon initial starting and completion of a predetermined stitching cycle, said system comprising electric drive means for said feed means, counting pulse generating means adapted to produce a series of consecutive electric counting pulses, each of said pulses representing a predetermined elemental movement of said feed means, electronic decade pulse counting means capable of counting a predetermined limit number and adapted to produce an output control pulse to stop said drive means upon reaching of said limit counting number, means to apply said pulses to said counting means, further means to preset said counting means to a predetermined number below said limit number, whereby to advance said feed means by a distance corresponding to the number complementary to said preset number, and delayed-action control means responsive to said control pulse, to start said machine and to initiate a stitching cycle upon completion of an advance movement by said feed means.

13. A system as claimed in claim 12, including programming switch means having multiple sets of contacts connected to said counting means, each said sets representing a different preset counting number, and means to operate said switch from one to the next set of contacts by said feed means upon completion of a feeding movement, whereby to perform a plurality of stitching operations by said machine at predetermined spaced points of said work piece in accordance with said preset counting numbers.

References Cited in the file of this patent

UNITED STATES PATENTS

| | | |
|---|---|---|
| 2,672,067 | Hansell | Mar. 16, 1954 |
| 2,672,284 | Dickinson | Mar. 16, 1954 |
| 2,705,907 | Caps et al. | Apr. 12, 1955 |
| 2,727,194 | Seid | Dec. 13, 1955 |
| 2,729,773 | Steele | Jan. 3, 1956 |
| 2,736,852 | Nelson | Feb. 28, 1956 |